O. O. HOOTMAN.
UNIVERSAL DRIVE FOR VEHICLES.
APPLICATION FILED SEPT. 2, 1914.
1,144,845.
Patented June 29, 1915.
3 SHEETS—SHEET 2.
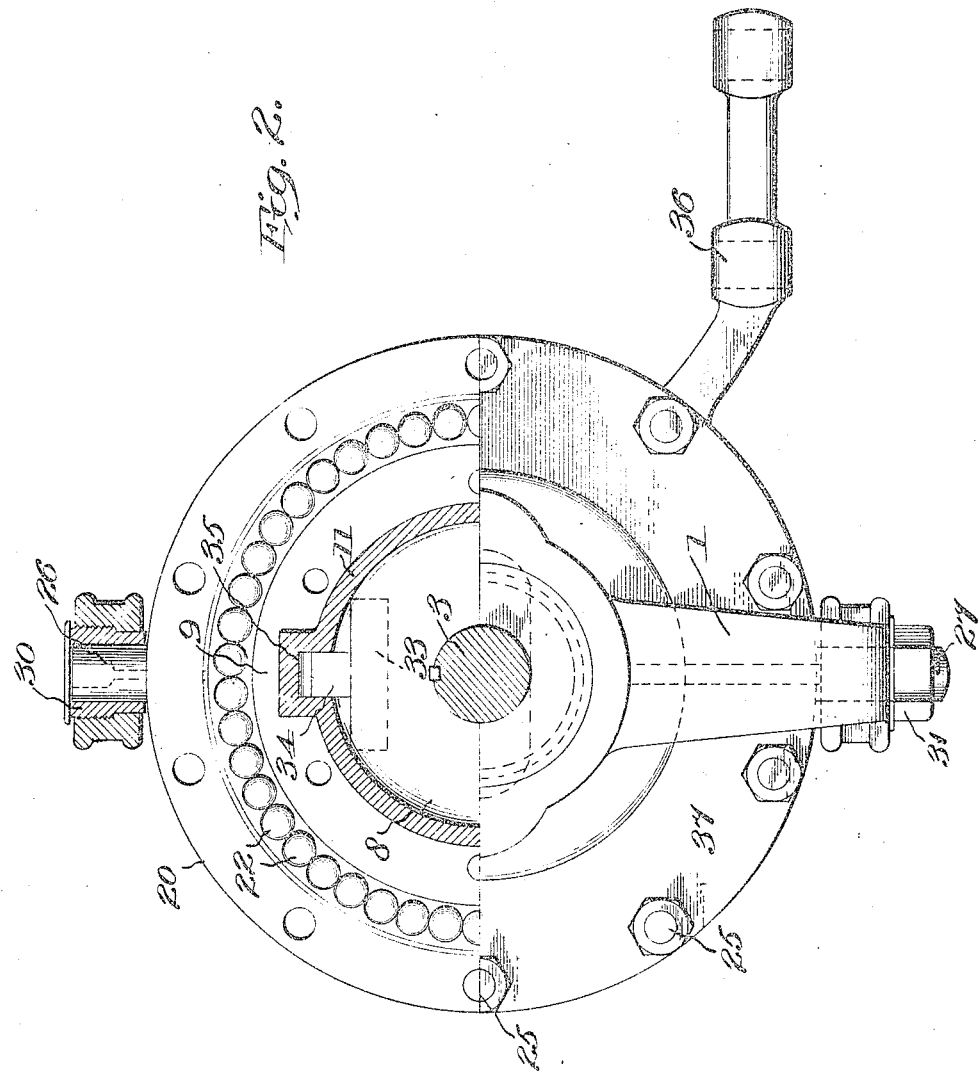

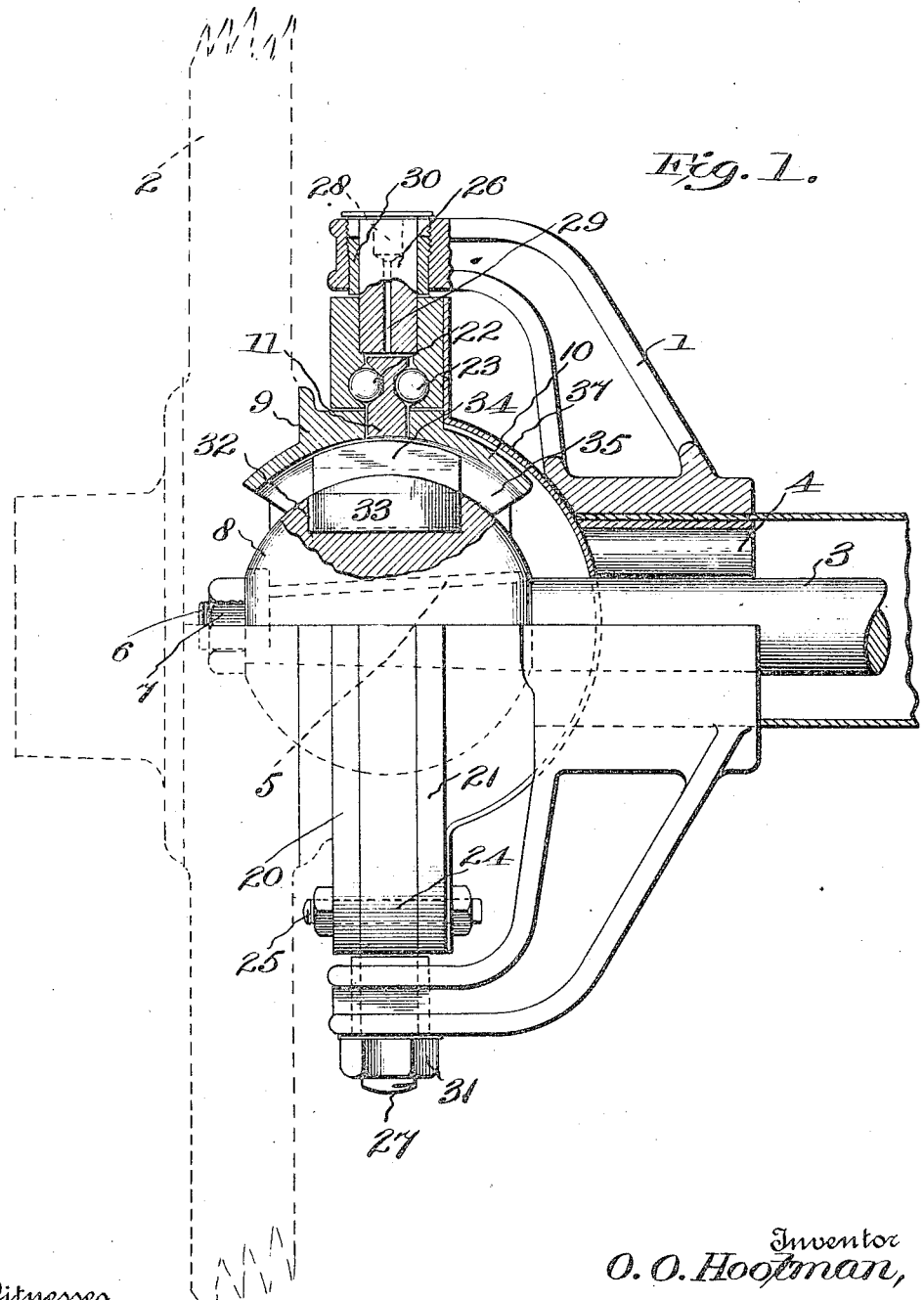

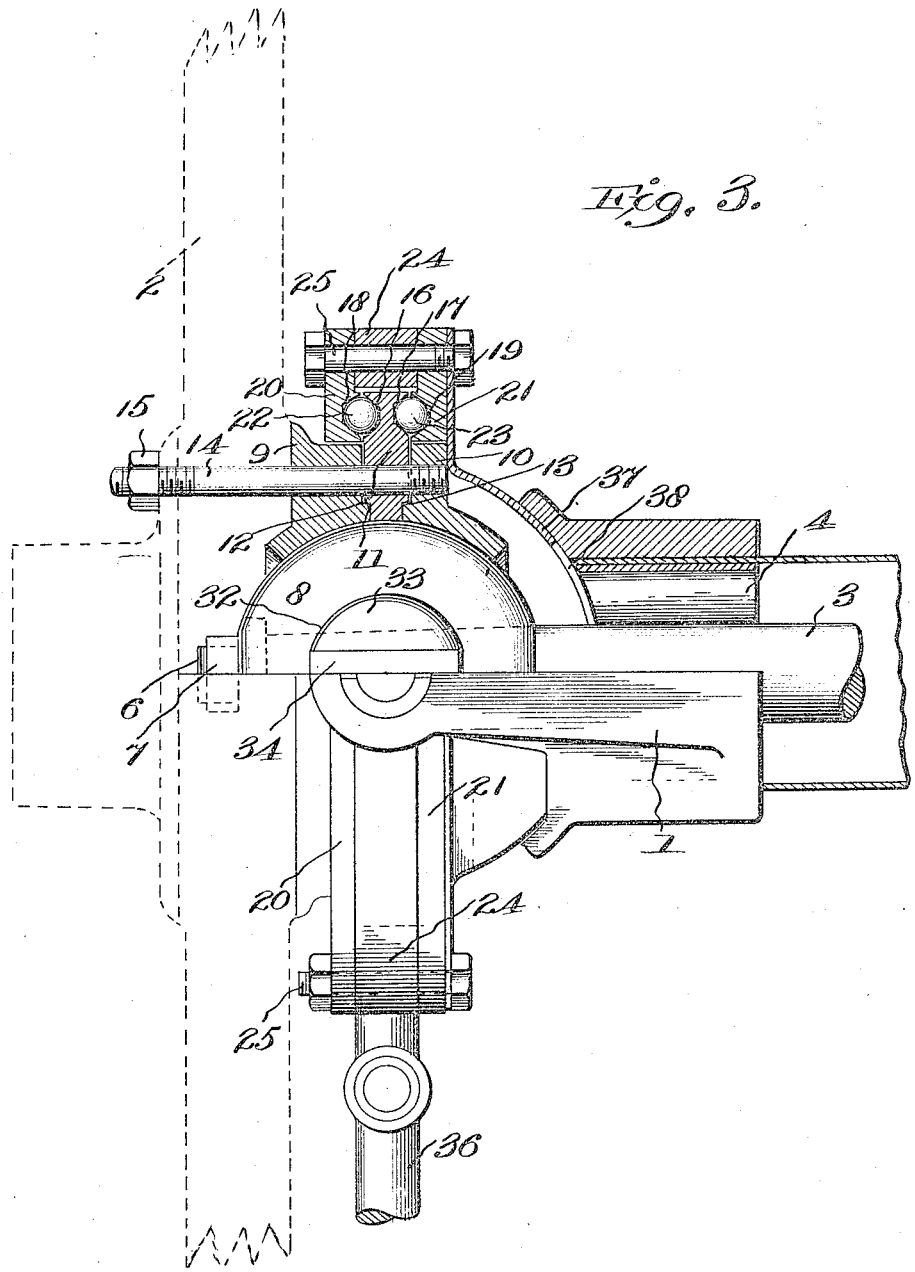

UNITED STATES PATENT OFFICE.

ORRA O. HOOTMAN, OF OROGRANDE, NEW MEXICO.

UNIVERSAL DRIVE FOR VEHICLES.

1,144,845.

Specification of Letters Patent. Patented June 29, 1915.

Application filed September 2, 1914. Serial No. 859,807.

*To all whom it may concern:*

Be it known that I, ORRA O. HOOTMAN, a citizen of the United States, residing at Orogrande, in the county of Otero and State of New Mexico, have invented certain new and useful Improvements in Universal Drives for Vehicles; and I do hereby declare the following to be a full, clear, and exact description of the invention, such as will enable others skilled in the art to which it appertains to make and use the same.

The present invention relates to improvements in universal drives for vehicles, and it consists more particularly in an arrangement for the application of power to the front wheels, or to both front and rear wheels of automobiles and like vehicles, whereby the front wheels may be driven to assist the rear wheels in the propulsion of the vehicle and at the same time be operated to steer the vehicle by either front wheels in the usual manner, or by both the front and rear wheels.

It is an object of the present invention to provide an improved universal drive of the above character wherein the parts constituting the same will be simple and economical of manufacture, and readily assembled and mounted on the vehicle; and the invention contemplates an arrangement wherein access can be readily had to the several parts for the purposes of removal, repair and replacement.

Another object of the present invention resides in providing a universal drive for vehicles, which will permit of the application of power to the front wheels, or both front and rear wheels, of the vehicle without diminishing the steering effect of the same and the facility with which the steering is accomplished.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a fragmentary front elevational view, partly in section, of a universal drive for vehicles as constructed in accordance with the present invention and applied to the front or rear wheel of an automobile, the wheel being shown by fragmentary broken lines. Fig. 2 is a side elevational view partly in section, and with parts broken away, of the same; and Fig. 3 is a top plan view of the same, partly in section and with parts broken away.

Referring more particularly to the drawings, wherein one embodiment of the invention is illustrated, 1 designates the forks usually found at the front of the chassis frames of automobiles and similar vehicles as now constructed, and in which the front wheels of the vehicle, here indicated at 2, are mounted to turn horizontally for purposes of steering. In accordance with the present invention, the steering wheels 2 of the vehicle are arranged to be connected to the engine or other suitable source of power carried by the vehicle, and driven therefrom; and to this end the forward, or both forward and rear ends of the chassis frame of the vehicle is or are provided with a drive shaft 3, connected in any suitable manner to the vehicle engine, and, as indicated in Figs. 1 and 3, the drive shaft 3 is journaled in suitable roller bearings 4 supported by an axle housing at the base of the forks 1.

As disclosed to advantage in Fig. 1, the drive shaft 3 is tapered or keywayed, as indicated at 5, and constructed with reduced ends 6 threaded for the reception of a nut 7. On each tapered end 5 of the drive shaft 3 is mounted a ball 8, secured thereon by the nut 7 and keyed to said shaft; and ball 8 constitutes one element of a universal joint and is mounted in a socket in the usual manner.

The socket for the universal ball 8 consists, in this instance, preferably of three coöperating annular members, the members 9 and 10 of which are oppositely disposed and arranged to secure therebetween the intermediate member 11. As illustrated in Fig. 3 the members 9 and 10 are preferably constructed with interior shoulders 12 and 13 for engagement by similar and coöperating shoulders on the intermediate member 11; and the three members are adapted to be rigidly connected to the wheel 2 by means of headless or other bolts 14, the latter being threaded into the annular member 10 and provided at their opposite ends with nuts 15 for securing the same in the wheel hub.

The intermediate annular member 11 of the universal socket, is preferably extended beyond the companion members 9 and 10, and is constructed with oppositely disposed annular depressions 16 and 17, coöperating with similar depressions 18 and 19 produced in rings 20 and 21, to form races for series of ball bearings 22 and 23. The rings 20 and 21 project beyond the intermediate annular member 11, and are connected together by an annulus 24 secured in place by means of bolts 25. The annulus 24 is cast, or otherwise formed, with trunnions 26 and 27 projecting from diametrically opposite points, and the same are arranged to be journaled in the forks 1 in the manner best illustrated in Fig. 1.

The upper trunnion 26 is preferably recessed at its upper end to provide for a grease cup 28, from which leads a duct 29 for conveying grease and oils to the ball bearings. The upper end of the trunnion is fitted by a bushing 30 threaded into the upper fork, and the same provides a bearing in which the trunnion 26 revolves freely.

As more particularly indicated in Fig. 2, the lower trunnion 27 is threaded for the reception of a nut 31, whereby the same may be secured against accidental displacement and prevent any undue freedom of movement of the parts.

It will be understood that while I have illustrated the above described means for mounting the device in the forks 1, the same is not essential to my invention, and I do not wish to be limited thereto as the mounting may be effected in any of a variety of other ways.

The ball 8 of the universal joint is provided with a circular recess 32, wherein is revolubly mounted a circular block 33, constructed spherical at the top thereof to conform to the curvature of the ball 8, and formed, substantially centrally thereof with a curved key 34. The key 34 slidingly fits in a key-way 35, formed in the socket members 9, 10 and 11, as shown in Figs. 1 and 2, and coöperates therewith to form the driving element for imparting to the wheel 2 rotary motion from the shaft 3.

In practice, assuming the block 33 and associated key 34 to be in the position shown in Fig. 1, and the vehicle to be turned to the right or left, the steering mechanism 36 would be operated in the usual manner to revolve the wheel 2 about the vertical pivots 26 and 27 in the desired direction. With such turning of the wheel 2, the socket members 9, 10 and 11, being rigidly connected to the same, will in like manner turn upon the universal ball 8 and the key-way 35 will be swung in a horizontal plane. This horizontal movement of the key-way 35 is permitted by means of the rotary block 33 of which the key 34 is a projection or part and the block 33 revolves freely in the recess 32 in accordance with the movement of the key 34 as compelled by the horizontal movement of the key-way 35 in steering the vehicle.

As the wheel 2 rotates the key 34 will be driven to a horizontal position, at an angle of ninety degrees from the position shown in Figs. 1 and 2, in which position movement of the wheels 2 about the steering journals to turn the vehicle in either direction, will operate to traverse the key 34 laterally in the key-way 35. Such oscillating movement of the key 34 in the key-way 35, and the rotary movement of the block 33 in the recess 32 of the ball 8, will be alternately accomplished as the wheel rotates and the key 34 moves into vertical position, in alinement with the trunnions 26 and 27, and into a horizontal position between said trunnions.

A dust guard or housing 37 is preferably provided for excluding dust, dirt, gravel, and the like, and the housing 37 is connected by the bolts 25 against the ring 21, and is provided with a slot 38 for engaging the drive shaft 3 to permit the steering movement of the vehicle wheels.

While I have illustrated and described but a single drive element 34 on the universal ball 8, it is to be understood that, in accordance with the principles of the invention, I may employ a plurality of such drive elements; and in practice I preferably adopt a construction employing two such elements arranged at diametrically opposite points on the ball 8.

I have illustrated and described preferred and satisfactory constructions, but obviously changes could be made in the herein described apparatus which could be used without departing from the spirit of my invention.

I claim:

1. In a universal drive for vehicles of the character described, the combination of a housing constructed with vertically-disposed forks, a drive shaft journaled in said housing, a universal ball fixedly mounted on said drive shaft within said forks, a wheel, a socket connected to said wheel for mounting the same on said universal ball and comprising a pair of shouldered lateral members, and a central member provided with shoulders coöperating with the shoulders on said lateral members and extending beyond the same, a drive element arranged between said universal ball and socket, a pair of rings disposed to either side of the projecting portion of said central socket member, races formed between said rings and each opposite face of said central socket member, bearings confined in said races, an annulus for connecting said rings, and pivots projecting from said annulus and journaled in said forks whereby the socket and connected wheel may be swung horizontally on said universal ball to steer the vehicle, substantially as described.

2. In a universal drive for vehicles of the character described, the combination of a housing constructed with vertically-disposed forks, a drive axle mounted in said housing, a universal ball fixedly mounted on said drive axle between said forks, a wheel, a socket mounted on said wheel and arranged to support the same from said universal ball, said socket comprising a pair of lateral shouldered members, and a central member provided with shoulders coöperating with the shoulders on said lateral members and projecting beyond the latter, a pair of rings disposed to either side of the projecting portion of said central socket member, races formed between said rings and said central socket member, bearings confined in said races, an annulus mounted between said rings concentrically with the central socket member, means for securing said rings and annulus together, pivots formed on said annulus and journaled in said forks to permit steering movement on said vehicle wheel, and a dust guard connected to the interior of said pair of rings and shaped to conform to the adjacent end of said housing, said dust guard being provided with a slot engaged over the drive axle for permitting the steering movement of said wheel, substantially as described.

In testimony whereof, I affix my signature, in presence of two witnesses.

ORRA O. HOOTMAN.

Witnesses:
W. N. FLECK,
F. E. HUNTER.